(No Model.)
J. A. FREEMAN & D. DONALD.
SELF ADJUSTING BEARING.
No. 432,608. Patented July 22, 1890.
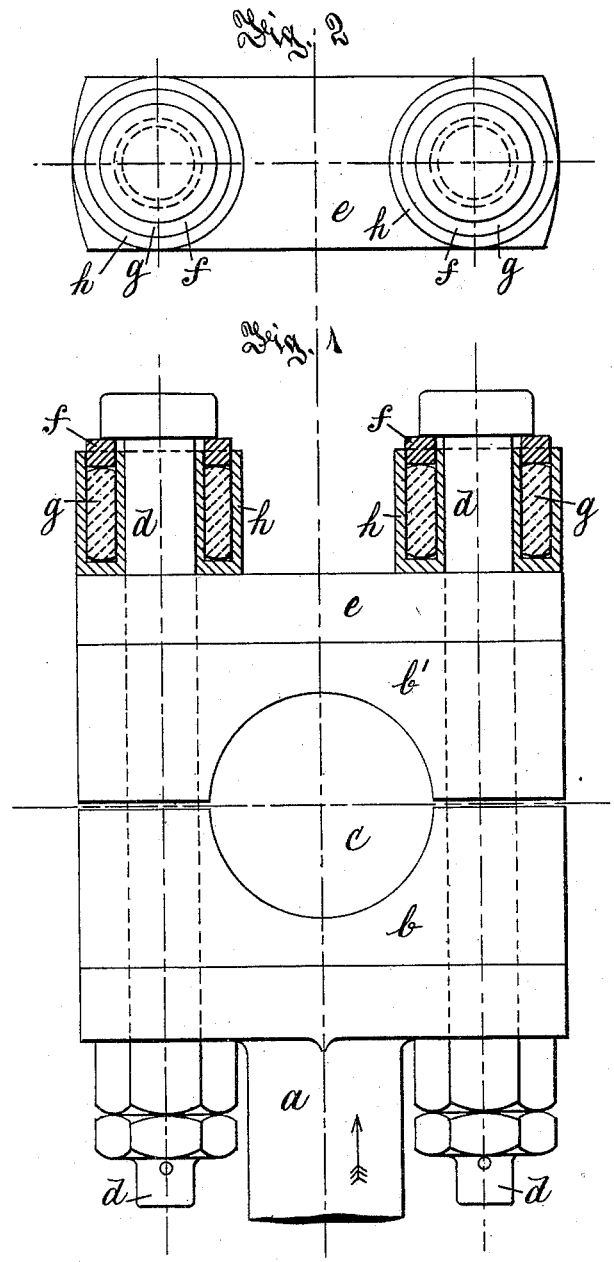

UNITED STATES PATENT OFFICE.

JOHN A. FREEMAN AND DAVID DONALD, OF PENRYN, COUNTY OF CORNWALL, ENGLAND.

SELF-ADJUSTING BEARING.

SPECIFICATION forming part of Letters Patent No. 432,608, dated July 22, 1890.

Application filed October 30, 1889. Serial No. 328,652. (No model.)

*To all whom it may concern:*

Be it known that we, JOHN ALBERT FREEMAN, granite merchant, and DAVID DONALD, engineer, subjects of the Queen of Great Britain, both residing at Penryn, Cornwall, England, have invented certain new and useful Improvements in Self-Adjusting Bearings, of which the following is a specification.

Our invention relates to bearings such as those in which shafts revolve or the brasses or bearings fitted to connecting-rods or to other brasses or bearings of the like kind; and the objects of our improvements are, first, to allow a certain amount of elasticity between the two parts of the brass or bearing, and, second, to provide for the perfect lubrication of the brass or bearing. We attain these objects by the means illustrated in the accompanying drawings, in which—

Figure 1 is a front view, partly in section, of the end of a connecting-rod; and Fig. 2 is an end view of the same.

Similar letters refer to similar parts in both views.

$a$ is the body of the connecting-rod; $b\ b'$, the brasses fitting a crank-pin at $c$, and $d\ d$ are the bolts by which the brasses are held together and are attached to the connecting-rod.

$e$ is a plate preferably arranged in the usual way upon the outer brass $b'$. The heads of the bolts $d\ d$ do not press directly upon the plate $e$, but upon a sufficiently strong ring or washer $f$, which itself presses upon one or more rings or cylinders of india-rubber or other similar elastic material $g$, which is fitted into a corresponding recess in a casing or ring $h$, which surrounds the bolt between its head and the plate $e$. The india-rubber $g$ being completely inclosed in the ring $h$, the distance through which its elasticity can operate when it is compressed by the washer $f$ is very small, so that it becomes practically incompressible after the washer has moved the very short distance required.

The two halves of the brasses $b\ b'$ do not quite meet when they are fitted upon the crank-pin, and the bolts $d\ d$ are screwed up, so as to give a sufficient initial pressure to the india-rubber springs $g\ g$, such initial pressure being determined as may be found advisable. When the strain (due to the pressure of the piston upon the connecting-rod) acts in the direction of the arrow, the springs $g\ g$ will be compressed (in addition to the initial compression) sufficiently to remove the inner brass $b$ from contact with the crank-pin, while when the connecting-rod is driven in the opposite direction the springs $g\ g$ will react and close the brasses upon the crank-pin without noise or shock.

The brasses $b\ b'$ are kept close against the crank-pin when in their normal condition, and continue to be so kept until they are so worn that they meet at the joint. The bearing is therefore self-adjusting, and, from the fact that the brass $b$ is withdrawn from the crank-pin during part of each revolution of the crank, perfect lubrication is effected.

What we claim, and desire to secure by Letters Patent of the United States, is—

1. The combination of the brasses $b\ b'$, bolts $d\ d$, and elastic rings or cylinders $g\ g$, substantially as and for the purpose described and shown.

2. In combination with the bolts $d\ d$ and elastic rings or cylinders $g\ g$, the rings or washers $f\ f$, substantially as described and shown.

3. In combination with the bolts $d\ d$ and elastic rings or cylinders $g\ g$, the casings or rings $h\ h$, substantially as described and shown.

In witness whereof we have hereunto signed our names in the presence of two subscribing witnesses.

JOHN A. FREEMAN.
DAVID DONALD.

Witnesses:
  R. F. STEPHENS,
  W. M. EDNEY,
*Solicitor's Clerks, Penryn, Cornwall.*